United States Patent [19]
Johnson, Jr.

[11] Patent Number: 5,162,496
[45] Date of Patent: Nov. 10, 1992

[54] METHOD FOR THE PREPARATION OF LIGHT-COLORED ROSIN ESTERS

[75] Inventor: Robert W. Johnson, Jr., Savannah, Ga.

[73] Assignee: Union Camp Corporation, Wayne, N.J.

[21] Appl. No.: 530,678

[22] Filed: May 30, 1990

[51] Int. Cl.[5] .................... C09F 1/00; C08L 93/04
[52] U.S. Cl. ............................... 530/212; 530/210; 530/213; 530/215; 530/216; 530/218; 530/219
[58] Field of Search ............... 530/200, 212, 213, 214, 530/215, 216, 218, 219

[56] References Cited

U.S. PATENT DOCUMENTS 4,248,770 2/1981 Matsuo et al. .................. 260/104

Primary Examiner—John Kight, III
Assistant Examiner—Richard Lee Jones
Attorney, Agent, or Firm—William K. Wissing

[57] ABSTRACT

The catalytic combination of a phosphite ester and a phenol sulfide is disclosed. The catalyst combination accelerates and mediates the esterification reaction of rosin with a polyhydric alcohol, resulting in esterified rosins having numerous advantageous characteristics and particular utility as tackifiers in hot melt adhesives.

22 Claims, No Drawings

METHOD FOR THE PREPARATION OF LIGHT-COLORED ROSIN ESTERS

BACKGROUND OF THE INVENTION

1. Field of the Invention

The present invention is directed to an improved method of making rosin esters. Specifically, the invention provides an improved esterification process wherein rosin and a polyhydric alcohol are reacted in the presence of a phosphite ester and a phenol sulfide, as a combined catalyst. The phosphite ester/phenyl sulfide catalyst serves to accelerate and mediate the formation of rosin esters, resulting in esterified rosins which have numerous advantageous characteristics and which have particular utility as tackifiers in hot melt adhesive formulations.

2. Description of the Prior Art

It has long been known that gum, wood, tall oil, and other rosins can be chemically transformed to highly useful products by reaction with aliphatic alcohols in esterification processes. The various applications available for the products of such processes have led to the development of a number of procedures for carrying out these esterifications.

U.S. Pat. No. 3,780,013, for example, teaches an esterification reaction wherein a phenol sulfide compound is added in incremental amounts to tall oil rosin and pentaerythritol in the presence of a catalyst such as calcium hydroxide or zinc oxide.

U.S. Pat. No. 2,729,660 describes the use of esters of phosphorus acid (phosphite esters) as catalysts in the esterification of fatty acids or rosin acids with aliphatic alcohols. A disagreeable odor, however, has been observed in the resultant rosin ester.

U.S. Pat. No. 4,693,847 discloses the use of organic esters of hypophosphorus acid to catalyze the esterification of rosin with a polyhydric alcohol.

In U.S. Pat. No. 4,548,746, phosphinic acid is employed as a catalyst in an esterification of rosin with pentaerythritol. Base is then added to neutralize any residual phosphinic acid catalyst. The neutralized product, however, often promotes cloudiness when employed as an additive in hot melt adhesives, producing an undesirable hot melt result.

U.S. Pat. No. 4,650,607 teaches the use of phosphinic acid plus a phenyl sulfide in the esterification of rosin with a polyhydric alcohol. As with the '746 patent, the residual acid catalyst should be neutralized, and such neutralization causes a cloudy hot melt product.

U.S. Pat. No. 4,744,925 discloses the esterification of a rosin that has been modified by reaction with a phenyl, aldehyde and/or dicarboxylic acid prior to phosphinic acid/phenylsulfide catalyzed esterification with a polyhydric alcohol. Again, the reaction product must be neutralized, which, as discussed above, results in an undesirable cloudy hot melt product when used in such operations.

U.S. Pat. No. 4,725,384 teaches the use of a magnesium salt of a carboxylic acid, such as magnesium acetate, to neutralize the residual mineral acid catalyst in phosphinic acid catalyzed rosin and polyhydric alcohol esterification reactions. However, despite some improvements, the hot melt is still judged to be somewhat hazy.

The object of the present invention is to provide a novel method for the preparation of esters of rosin. It is a further object of the subject invention to employ a catalyst which accelerates the rosin esterification reaction rate and results in reduced reaction time. It is a still further object of the invention to provide a process which produces a rosin ester having particular utility as a tackifier in hot melt adhesive formulations. It is an even further object of this invention to provide a method of preparing esters of rosin exhibiting a color essentially equivalent to or lighter than the starting rosin.

SUMMARY OF THE INVENTION

The foregoing as well as the other objects are met by the surprising discovery that phosphite esters can be employed along with phenol sulfides as a combined catalyst to effectively accelerate and mediate rosin esterification reactions. Specifically, in accordance with the present invention, rosin is reacted with a polyhydric alcohol in the presence of a catalytically effective amount of a phosphite ester and a phenol sulfide. The resulting product is particularly useful as a tackifier ingredient in hot melt adhesive formulations.

DETAILED DESCRIPTION OF THE INVENTION

Rosin, one of the reactants of the process of the invention, is primarily a mixture of $C_{20}$, fused-ring, monocarboxylic acids, typified by levopimaric and abietic acids, both of which are susceptible to numerous chemical transformations. Exemplary of such rosins are the gum rosins, wood rosins, and tall oil rosins. Also included with the ambit of the term rosin, as used herein, are the rosin acids contained in said rosins, such as, for example, abietic acid, pimaric acid and dehydroabietic acid. Preferably, the rosin employed is tall oil rosin.

The natural separation and gradual conversion of some of the hydrophilic components of sap and related plant fluids from the cambium layer of a tree into increasingly hydrophobic solids comprise the generic processes of forming diverse gums, resins and waxes. The oleoresin intermediate in this process is typified in pine gum, which flows from hacks on the trunks of southern yellow pine found primarily in Brazil, China and Portugal as well as in other countries. Pine gum contains about 80% gum rosin and about 20% turpentine. Resinification from oleoresin can result from either natural evaporation of oil from an extrudate or slow collection in ducts in sapwood and heartwood. Pinus stumps are valuable enough to be harvested, chipped, and extracted with hexane or higher-boiling paraffins to yield wood rosin, wood turpentine, and other terpene-related compounds by fractional distillation. In the kraft, i.e., sulfate, pulping process for making paper, pinewood is digested with alkali producing crude tall oil and crude sulfate turpentine as by-products. Fractionation of the crude tall oil yields tall oil rosin and fatty acids.

The gum, wood, tall oil and other rosins may be employed in the processes of the present invention as is, or alternatively may be subjected to other treatments prior to use in the present esterification process. For example, the rosin material may be subjected to distillation, disproportionation, hydrogenation or polymerization, or some combination of these and/or other treatments, prior to use in the subject processes.

Polyhydric alcohols, also sometimes referred to as polyols, the other reactant employed in the subject process, are also well known. Exemplary of such compounds are ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol and sorbitol. Preferably, the polyhydric alcohols employed are glycerol or pentaerythritol. The amount of the alcohol employed in the esterification process may be varied widely. Generally, however, at least about an equivalent amount of polyhydric alcohol, based on the amount of rosin, is employed, with the upper limit generally being about 50% excess over the equivalent.

Phosphite esters, also sometimes termed esters of phosphorus acids, are employed in combination with phenyl sulfides to catalytically accelerate and mediate the present esterification process.

The phosphite esters used in the present invention are either aliphatic or aromatic esters of phosphorus acid. The phosphorus acid may be completely or only partially esterified. Typical of the phosphite esters which may be employed are triphenylphosphite, triparacresylphosphite, tri-(2-ethylhexyl)- phosphite, di-(2-ethylhexyl)phosphite, trisnonylphenylphosphite and tris(2,4-di-tert-butylphenyl)phosphite. Preferably, the phosphite esters are trisnonylphenylphosphite or tris(2,4-di-tert-butylphenyl)phosphite.

Various phenyl sulfides are employed in the subject invention. Preferably, the phenol sulfides utilized are those set forth in U.S. Pat. Nos. 3,780,013 and 4,650,607, the disclosures of each of which are incorporated herein by reference. As stated in the aforementioned patents, such phenol sulfides may be represented by the formula:

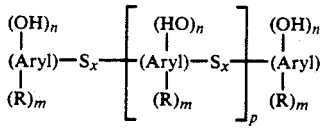

wherein n is an integer from 1 to 3 inclusive, p is an integer from 0 to 100 and preferably about 5 to 20 inclusive, and the sum of m and n on each aryl is between 1 and 5 inclusive, x is 1, 2 or 3, and R is a hydrocarbon group, e.g., alkyl cycloalkyl and substituted alkyl, e.g., $C_1$-$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms, inclusive, typically phenyl, naphthyl and anthracyl. Typical cycloalkyl groups contain 3-8 carbon atoms in the ring, e.g., cyclopropyl, cyclopentyl and cyclohexyl.

A catalytically effective amount of the foregoing phosphite esters and phenol sulfides are employed in the process of the invention. Generally, a catalytically effective amount is from about 0.01% to about 2.0% phosphite ester, and from about 0.05% to about 1.0% phenol sulfide, each based on the weight of the rosin.

In general, esterification is effected by introducing the rosin, usually up to about 50% equivalent excess of a polyhydric alcohol, preferably about 15% to about 20% equivalent excess of polyhydric alcohol, and from about 0.1% to about 2.0% phosphite ester, and from about 0.05% to about 1.0% phenol sulfide, based on the weight of the rosin, into a reaction vessel. The temperature of the reactor vessel is then preferably raised to from about 180° C. to about 300° C., most preferably to from about 250° C. to about 280° C., generally for up to about 15 hours or until the rosin acid number is reduced to about 15 or below. Longer reaction times may be employed, but the additional time and energy costs often outweigh any benefits received. The preferred amount of phosphite ester is from about 0.2% to about 0.5%, based on the weight of the rosin, with no appreciable benefit generally observed in employing amounts of 0.5% or more of the phosphite ester. The preferred amount of phenol sulfide is from about 0.2% to about 0.5%, based on the weight of the rosin.

Advantageously, the esterification reaction is carried out in the presence of an inert atmosphere, provided by, for example, a nitrogen or carbon dioxide purge on the reaction vessel prior to addition of the reactants, and, for example, a nitrogen or carbon dioxide sparge during the reaction. The minimization of oxygen exposure through such means is helpful in achieving a light color rosin ester, since the rosin ester is apt to darken when exposed to excessive amounts of oxygen.

In a particularly preferred embodiment of the process of the invention, the rosin starting material is melted in an inert atmosphere in the reaction vessel, followed by the addition of about 0.2% (based on the weight of the rosin) of phosphite ester, about 0.5% (based on the weight of the rosin) of a phenol sulfide, and about 15-20% equivalent excess glycerol or pentaerythritol. A very low inert gas sparge, such as nitrogen or carbon dioxide, is maintained as the mixture is heated to about 250° C. with agitation, which temperature is maintained for about three hours. The reaction temperature then is increased to about 275° C. until the reaction product acid number is decreased to about 15 or below, or for a time of about 2 to 12 hours.

The catalyst combination of the present invention provides an accelerated process which results in a superior rosin ester product possessing properties making it highly useful as a tackifier ingredient in hot melt adhesive formulations, as well as in other applications. One advantage of the combined phosphite ester and phenol sulfide catalyst is minimal color degradation during esterification, the combined catalysts of the invention acting to produce an ester of an essentially equivalent color of the starting rosin. The product is also relatively clear, rather than cloudy, hazy or char-containing (containing very fine black particles), as is the case with many of the phosphoric or phosphinic acid catalyzed esterification products, and the product exhibits little or no odor unlike some of the phosphite ester catalyzed reaction products. In hot melt applications, the product exhibits good viscosity stability and evidences minimal skin formation. Moreover, the esterification process is relatively straight-forward, not requiring an additional post-esterification step such as neutralization, as required in the acid catalyzed processes.

The following Examples serve to illustrate the unexpected color improvement and enhanced hot melt properties of rosin esters prepared by the processes of the invention. These Examples, however, are not to be construed as limiting the scope of the appended Claims.

In each of the following Examples, the color of the rosin ester product was reported, based on a Gardner scale, and the presence or absence of char noted. Each rosin ester was then also tested as a tackifier in a hot melt adhesive formulation, and percent skin and viscosity change, each after 96 hours, was noted.

Examples 1, 2, 6, and 7 and 8 are comparative Examples. Examples 3, 4, 5 and 9 are Examples of the invention.

EXAMPLE 1

(Comparative Example)

In a suitable reaction vessel, tall oil rosin was melted under a nitrogen blanket. Glycerol (20% excess) was added slowly at 180° C., followed by addition of 0.4% Vultac ® 2 phenol sulfide (an amyl phenol sulfide polymer sold by Penwalt, Atochem North America, Philadelphia, Pa., 19102) and 0.025% phosphoric acid. The mixture was then heated at 230° C. for 4 hours with agitation, after which the temperature was increased to 270° C. and held until the acid number was below 15. The product was observed and then tested as a tackifier. The results are shown in Table 1.

EXAMPLE 2

(Comparative Example)

In a suitable reaction vessel, tall oil rosin was melted under a nitrogen blanket. Glycerol (20% excess) was added slowly at 180° C., followed by addition of 0.4% Vultac ® 2 phenol sulfide and 0.05% phosphinic acid. The mixture was then heated at 230° C. for 4 hours with agitation, after which the temperature wa increased to 270° C. and held until the acid number was below 15. The product was then observed and tested as a tackifier. The results are shown in Table 1.

EXAMPLE 3

In a suitable reaction vessel, tall oil rosin was melted under a nitrogen blanket. Glycerol (20% excess) was added slowly at 180° C., followed by addition of 0.4% Vultac ® 2 phenol sulfide and 0.20% trisnonylphenylphosphite (hereinafter TNPP) (Weston ® TNPP, available from GE Specialty Chemicals, Inc. Parkersburg, W. Va. 26102). The mixture was then heated at 230° C. for 4 hours with agitation, after which the temperature was increased to 270° C. and held until the acid number was below 15. The product was observed and then tested as a tackifier. The results are shown in Table 1.

EXAMPLE 4

In a suitable reaction vessel, tall oil rosin was melted under a nitrogen blanket. Glycerol (20% excess) was added slowly at 180° C., followed by addition of 0.4% Vultac ® 2 phenol sulfide and 0.20% Irgafos ® 168 tris(2,4-di-ter-butylphenyl)phosphite (Irgafos ® 168 available from Ciba-Geigy Corp., Hawthorne, N.Y., 10532). The mixture was then heated at 230° C. for 4 hours with agitation, after which the temperature was increased to 270° C. and held until the acid number was below 15. The product was observed and then tested as a tackifier. The results are shown in Table 1.

EXAMPLE 5

In a suitable reaction vessel, tall oil rosin was melted under a nitrogen blanket. Glycerol (20% excess) was added slowly at 180° C., followed by addition of 0.4% Vultac ® 2 phenol sulfide and 0.20% Agerite Geltrol ® alkylated-arylated bisphenolic phosphite, available from RT Vanderbilt, Norwalk, Conn., 06855). The mixture was then heated at 230° C. for 4 hours with agitation, after which the temperature was increased to 270° C. and held until the acid number was below 15. The product was observed and then tested as a tackifier. The results are shown in Table 1.

EXAMPLE 6

(Comparative Example)

In a suitable reaction vessel, tall oil rosin was melted under a nitrogen blanket. Glycerol (20% excess) was added slowly at 180° C., followed by addition of 0.4% Vultac ® 2 phenol sulfide and 0.20 $Li_2CO_3$. The mixture was then heated at 230° C. for 4 hours with agitation, after which the temperature was increased to 270° C. and held until the acid number was below 15. The product was observed and then tested as a tackifier. The results are shown in Table 1.

EXAMPLE 7

(Comparative Example)

In a suitable reaction vessel, tall oil rosin was melted under a nitrogen blanket. Pentaerythritol (15% excess) was added slowly at 180° C., followed by addition of 0.4% Vultac ® 2 phenol sulfide and 0.10% phosphinic acid. The mixture was then heated at 230° C. for 4 hours with agitation, after which the temperature was increased to 270° C. and held until the acid number was below 15. The product was observed and then tested as a tackifier. The results are shown in Table 2.

EXAMPLE 8

(Comparative Example)

An additional reaction was carried out as in Example 7, except that the phosphinic acid was first neutralized according to Example 1 in U.S. Pat. No. 4,725,384. The product was observed and then tested as a tackifier. The results are shown in Table 2.

EXAMPLE 9

In a suitable reaction vessel, tall oil rosin was melted under a nitrogen blanket. Pentaerythritol (15% excess) was added slowly at 180° C., followed by addition of 0.4% Vultac ® 2 phenol sulfide and 0.25% trisnonylphenylphosphite (Weston ® TNPP, available from GE Specialty Chemicals, Inc., Parkersburg, W. Va. 26102). The mixture was then heated at 230° C. for 4 hours with agitation, after which the temperature was increased to 270° C. and held until the acid number was below 15. The product was observed and then tested as a tackifier. The results are shown in Table 2.

Various modifications of the invention in addition to those shown and described herein will be apparent to those skilled in the art from the foregoing description. Such modifications are also intended to fall within the scope of the appended Claims.

TABLE 1

| | GLYCEROL ESTERS OF ROSIN (20% excess glycerol) | | | | HOT MELT PROPERTIES | |
|---|---|---|---|---|---|---|
| | | | ROSIN ESTER | | % SKIN | % VISC. CHANGE |
| EXAMPLE | CATALYST | % CAT. | COLOR, G | CHAR | 96 HRS | 96 HRS |
| 1 | Phosphoric | 0.025 | 5− | yes | 40 | +19 (Comp. Ex.) |

TABLE 1-continued
GLYCEROL ESTERS OF ROSIN (20% excess glycerol)

| | | | ROSIN ESTER | | HOT MELT PROPERTIES | | |
| --- | --- | --- | --- | --- | --- | --- | --- |
| EXAMPLE | CATALYST | % CAT. | COLOR, G | CHAR | % SKIN 96 HRS | % VISC. CHANGE 96 HRS | |
| 2 | Acid Phosphinic | 0.05 | 4 | yes | 1 | +24 | (Comp. Ex.) |
| 3 | TNPP | 0.20 | 3+ | no | 8 | +8 | |
| 4 | Irgafos ® 168 | 0.20 | 3 | no | 15 | +1 | |
| 5 | alkylated-arylated bisphenolic phosphite | 0.20 | 3+ | no | 0 | +16 | |
| 6 | Li$_2$CO$_3$ | 0.20 | 6 | no | 65 | −25 | (Comp. Ex.) |

TABLE 2
PE ESTERS OF ROSIN (15% excess pentaerythritol)

| | | ROSIN ESTER | | | | HOT MELT PROPERTIES | | |
| --- | --- | --- | --- | --- | --- | --- | --- | --- |
| EXAMPLE | CATALYST | % CAT. | COLOR, G | CHAR | CLARITY | % SKIN 96 HRS | % VISC. CHANGE 96 HRS | |
| 7 | Phosphinic Acid | 0.10 | 3+ | no | clear | 15 | +50 | (Comp. Ex.) |
| 8 | Neutralized Phosphinic Acid | 0.10 | — | — | hazy | 25 | +20 | |
| 9 | TNPP | 0.25 | 4 | no | clear | 20 | +14 | |

What is claimed is:

1. A process for esterifying rosin with a polyhydric alcohol which comprises reacting the rosin and polyhydric alcohol in the presence of a catalytically effective amount of a phosphite ester and a phenol sulfide.

2. The process of claim 1 wherein the rosin is selected from the group consisting of gum rosin, wood rosin and tall oil rosin.

3. The process of claim 1 wherein the polyhydric alcohol is selected from the group consisting of ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol and sorbitol.

4. The process of claim 3 wherein the polyhydric alcohol is selected from the group consisting of glycerol and pentaerythritol.

5. The process of claim 1 wherein the rosin is esterified with up to about 50% excess equivalent of the polyhydric alcohol.

6. The process of claim 5 wherein the polyhydric alcohol is present in an amount of about 5% to about 20% equivalent excess.

7. The process of claim 1 wherein the phosphite ester is selected from the group consisting of triphenylphosphite, triparacresylphosphite, tri-(2-ethylhexyl)-phosphite, di-(2-ethyl-hexyl)phosphite, trisnonylphenylphosphite and tris(2,4-di-tert-butylphenyl)-phosphite.

8. The process of claim 7 wherein the phosphite ester is trisnonylphenylphosphite.

9. The process of claim 1 wherein the phosphite ester is present in an amount of about 0.01% to about 2.0%.

10. The process of claim 9 wherein the phosphite ester is present in an amount of about 0.05% to about 0.5%.

11. The process of claim 1 wherein the phenol sulfide is a compound of the formula $$(Aryl)\begin{matrix}(OH)_n\\|\\-S_x\\|\\(R)_m\end{matrix}\left[\begin{matrix}(HO)_n\\|\\-(Aryl)-S_x\\|\\(R)_m\end{matrix}\right]_p\begin{matrix}(OH)_n\\|\\-(Aryl)\\|\\(R)_m\end{matrix}$$

wherein n is an integer from 1 to 3, p is an integer from 0 to 100, x is 1 to 3, the sum of m and n on each aryl is from 1 to 5 aryl is selected from the group consisting of phenyl, naphthyl and anthracyl, and R is a hydrocarbon radical of 1 to 22 carbon atoms.

12. The process of claim 1 wherein the phenol sulfide is present in an amount of about 0.05% to about 1.0%.

13. The process of claim 12 wherein the phenol sulfide is present in an amount of about 0.2% to about 0.5%.

14. The process of claim 1 wherein the reaction is carried out at temperatures from about 180° C. to about 300° C.

15. The process of claim 14 wherein the reaction is carried out at temperatures from about 250° C. to about 280° C.

16. The process of claim 1 wherein the reaction is carried out in an inert atmosphere.

17. The process of claim 16 wherein the inert atmosphere is a nitrogen atmosphere.

18. The process of claim 1 wherein the reaction is carried out for about 5 to about 15 hours.

19. In a process for preparing a hot melt adhesive comprising a wax, a polymer, and a tackifier, the improvement which comprises employing as the tackifier a rosin ester prepared by reacting rosin and a polyhydric alcohol in the presence of a catalytically effective amount of a phosphite ester and a phenol sulfide.

20. An improved tackifier for use in hot melt adhesives comprising a rosin ester prepared by reacting rosin and polyhydric alcohol in the presence of a catalytically effective amount of a phosphite ester and a phenol sulfide.

21. A product produced by the process of claim 1.

22. A product produced by the process of claim 19.

* * * * *